(12) United States Patent
Geddam et al.

(10) Patent No.: US 8,732,134 B2
(45) Date of Patent: May 20, 2014

(54) COLLECTION OF DATA ASSOCIATED WITH STORAGE SYSTEMS

(75) Inventors: Kishore Geddam, Bangalore (IN); Harish Kumar Sampangi Rama, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 182 days.

(21) Appl. No.: 13/013,624

(22) Filed: Jan. 25, 2011

(65) Prior Publication Data

US 2014/0081906 A1 Mar. 20, 2014

(51) Int. Cl.
*G06F 17/30* (2006.01)

(52) U.S. Cl.
USPC .......................................................... 707/665

(58) Field of Classification Search
USPC .......................................... 707/661, 665–667
See application file for complete search history.

(56) References Cited

U.S. PATENT DOCUMENTS

| | | | |
|---|---|---|---|
| 7,246,105 B2* | 7/2007 | Numanoi et al. ..................... 1/1 |
| 7,385,924 B1* | 6/2008 | Riddle ........................... 370/235 |
| 7,472,182 B1* | 12/2008 | Young et al. .................. 709/224 |
| 7,539,706 B1* | 5/2009 | Campbell .............................. 1/1 |
| 7,631,002 B2* | 12/2009 | Numanoi et al. ..................... 1/1 |
| 7,958,095 B1* | 6/2011 | Campbell ...................... 707/665 |
| 7,984,515 B1* | 7/2011 | Patsenker et al. ............... 726/31 |
| 2003/0200304 A1* | 10/2003 | Thorpe et al. ................. 709/224 |
| 2004/0158604 A1* | 8/2004 | Hepworth et al. ............. 709/200 |
| 2005/0071457 A1* | 3/2005 | Yang-Huffman et al. ..... 709/224 |
| 2005/0120025 A1* | 6/2005 | Rodriguez et al. .............. 707/10 |
| 2007/0078972 A1* | 4/2007 | Yagishita ....................... 709/224 |
| 2007/0156656 A1* | 7/2007 | Pather et al. ....................... 707/3 |
| 2010/0138384 A1* | 6/2010 | Rodriguez et al. ............ 707/609 |
| 2011/0185130 A1* | 7/2011 | Hara et al. ..................... 711/154 |

* cited by examiner

*Primary Examiner* — Cam-Linh Nguyen (74) *Attorney, Agent, or Firm* — Mahamedi Paradice Kreisman LLP (57) ABSTRACT

Example embodiments provide various techniques for collecting data associated with the performance of a storage system. In one method, an attribute associated with the storage system is detected and a data collection policy associated with the attribute is identified. Here, the data collection policy defines a type of data associated with the performance to be collected. With the data collection policy identified, the data are then collected based on the data collection policy.

20 Claims, 8 Drawing Sheets

COLLECTION OF DATA ASSOCIATED WITH STORAGE SYSTEMS

COPYRIGHT

A portion of the disclosure of this document may include material that is subject to copyright protection. The copyright owner has no objection to the facsimile reproduction by anyone, of the patent document or the patent disclosure, as it appears in the U.S. Patent and Trademark Office patent files or records, but otherwise reserves all copyright rights whatsoever. The following notice applies to the software, data, and/or screenshots that may be illustrated below and in the drawings that form a part of this document. Copyright © 2011, NetApp. All Rights Reserved.

FIELD

The present disclosure relates generally to storage systems. In an example embodiment, the disclosure relates to the collection of data associated with storage systems.

BACKGROUND

A number of different storage management applications are currently available for use in monitoring, managing, and optimizing storage systems. In particular, many of these applications provide and monitor various performance statistics of one or more storage systems. An administrator of the storage systems can use such performance statistics to manage and optimize the storage systems.

To gather such performance statistics, many conventional storage management applications are programmed to periodically poll each storage system for data and store the data in one or more files. However, these applications typically collect more data than is actually used. For example, an administrator may be interested in the performance statistics associated with a capacity of a storage server over a period of time. However, in addition to collecting such capacity data, many other types of data irrelevant to the capacity are also collected, such as processor hit rates, network bandwidth, and other non-relevant information.

The collection of such a large amount of data places a heavy load on the storage systems because, in one example, communication of such data requires a large amount of network bandwidth and processing power. Thus, the collection of such a large amount of data may negatively affect performances of the storage systems. Additionally, a large amount of data storage capacity is required to store the collected data, and such capacity might not be readily available.

SUMMARY

Example embodiments provide various techniques for collecting data related to the performance of a storage system. In general, a storage system operates on behalf of clients to store and manage shared files or other data in a set of mass storage devices. In order to manage and optimize such a storage system, an administrator or a different user of the storage system needs to monitor various performance statistics associated with the storage system. To compile the performance statistics, a variety of different data are collected from the storage system. In one example, the data can be collected based on a data collection policy defined by a user. In this data collection policy, a user can define parameters or rules associated with the collection and handling of such data. For example, the user can specify a particular type of data to be collected. In another example, the user can specify the sample rate at which the data are to be collected. In yet another example, the user can specify how long the collected data are to be retained before being deleted.

Additionally, the selection of which data collection policy to use in the data collection can be triggered by a variety of attributes associated with a storage system. For example, each data collection policy can be defined for use with a particular attribute that has been detected, such as the type of communication protocol used by the storage system. Accordingly, a different data collection policy can be applied based on, for example, the type of communication protocol used by the storage system. Another example of an attribute that can be tied to a data collection policy is a type of application being hosted within the storage system.

As a result, instead of collecting all performance data, a data collection policy can provide a mechanism to filter or limit the scope of the data collection to only data that are relevant to a set of performance statistics that are of interest to the user. The amount of storage capacity allocated for storing such data may therefore be reduced. Additionally, collection of a smaller amount of data may possibly increase the performance of the storage system.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
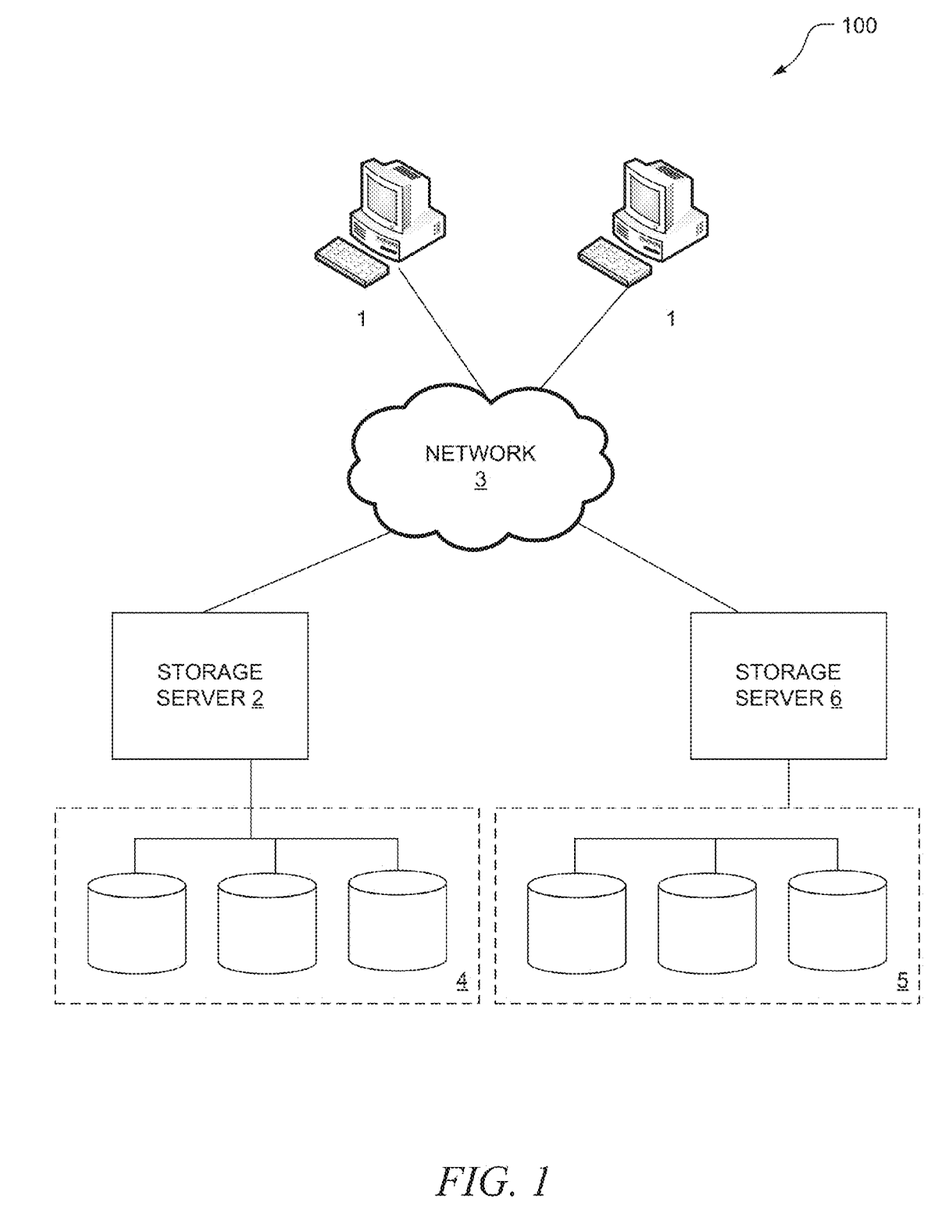
FIG. 1 depicts a block diagram of an example embodiment of a storage system.

FIG. 1 depicts a block diagram of an example embodiment of a storage system 100. Generally, the storage system 100 operates on behalf of client processing systems ("clients") 1 to store and manage shared files or other units of data (e.g., blocks) in a set of mass storage devices. In storage system 100, a number of clients 1 are in communication with storage servers 2 and 6 through network 3, such as a local area network (LAN), a wide area network (WAN), and a storage area network (SAN). The storage servers 2 and 6 are in communication with storage subsystems 4 and 5, which is comprised of mass storage devices.

Each of the clients 1 may be, for example, a conventional personal computer (PC), a workstation, a smart phone, or other processing systems. The storage servers 2 and 6 manage the storage subsystems 4 and 5, respectively, and receive and respond to various read and write requests from clients 1, directed to data stored in, or to be stored in, the storage subsystems 4 and 5. The mass storage devices in the storage subsystems 4 and 5 may be, for example, conventional magnetic disks, flash memory, optical disks such as CD-ROM or DVD, magneto-optical (MO) storage, or any other type of non-volatile storage devices. The mass storage devices may be organized into one or more volumes of Redundant Array of Inexpensive Disks (RAID).

In addition to the example depicted in FIG. 1, the storage system 100 can have many other different configurations. For example, in an alternative configuration, the storage server 6 may serve a separate set of clients coupled to the storage server 6. In another configuration, some of the mass storage devices included in the storage subsystem 5 may be configured to operate under the direct control of the storage server 2 and vice versa, where some of mass storage devices included in the storage subsystem 4 may be configured to operate under the direct control of storage server 6 (e.g., a cluster-failover configuration). In other configurations, one or more additional storage servers may be coupled to the source storage server 2 and/or to the storage server 6.

Figure 2:
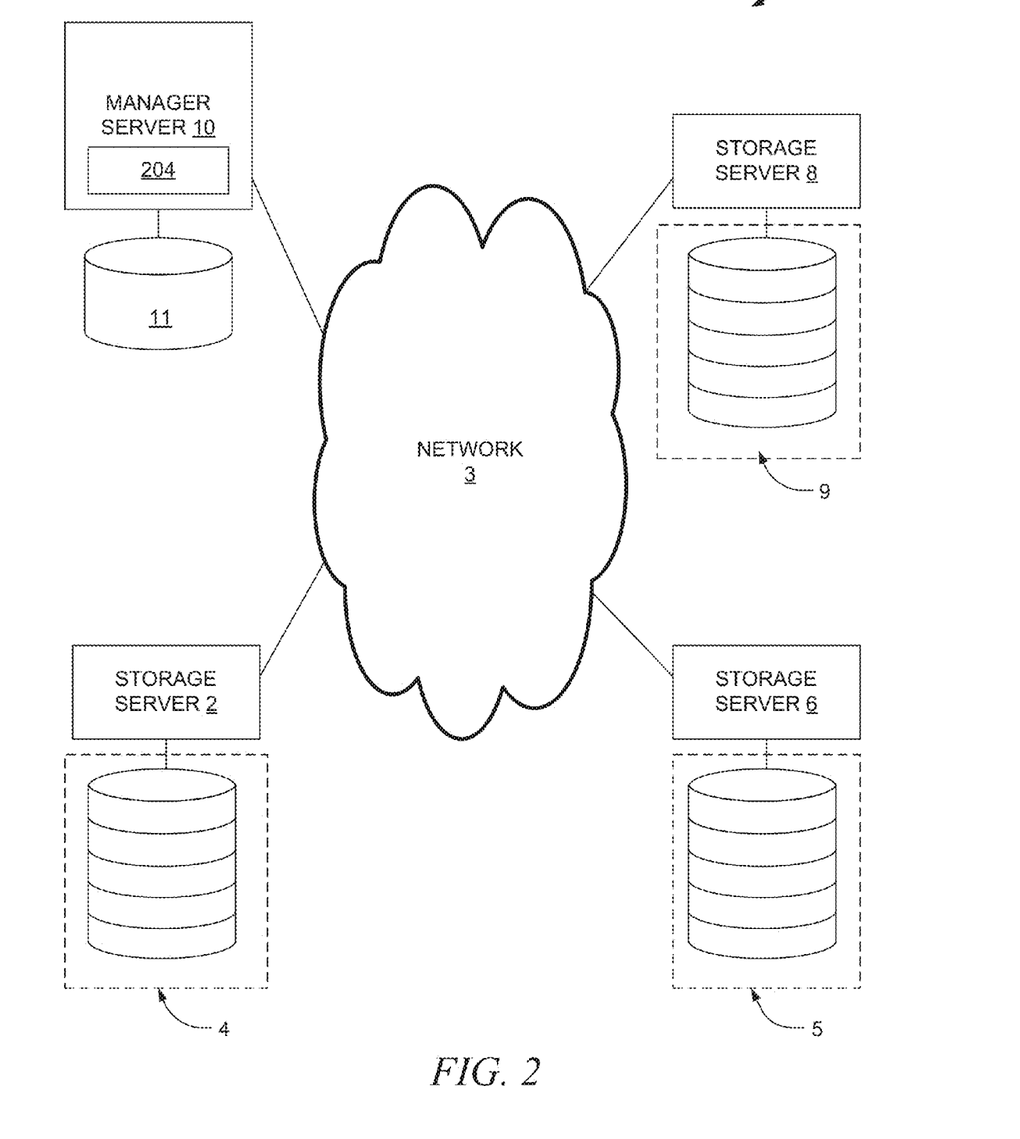
FIG. 2 depicts a block diagram of a more detailed example of a storage system that includes a manager server.

FIG. 2 depicts a block diagram of a more detailed example of a storage system 200 that includes a manager server 10. As depicted, this storage system 200 includes storage servers 2, 6, and, 8 in communication with their respective storage subsystems 4, 5, and 9. Additionally included in the storage system 200 is a manager server 10 and a storage 11 associated with the manager server 10. The manager server 10 is in communication with all three storage servers 2, 6, and 8 by way of network 3. Alternatively, the manager server 10 can be directly connected to each storage server 2, 6, and 8 (e.g., direct cable connection).

The manager server 10 can be a storage server or can be a specialized server specifically configured for central management. For example, any storage server 2, 8, or 6 connected to network 3 can also act as a manager server 10. Thus, which storage server 2, 6, or 8 is the manager server 10 is relative in such an example. That is, a server can function like a manager server 10 for some purposes and function like a storage server for other purposes. In another example, the manager server 10 can be any suitable computing server connected to the network 3, and can be implemented using software running on a variety of operating systems. It should be appreciated that the reference to a server as a "manager server" is purely descriptive; a "manager server" can be any suitable server being used to centrally manage remote and local data replication relationships.

In this example, the manager server 10 is adapted to host or run a storage management application 204 that provides monitoring and management for enterprise storage and content delivery environments. For example, the manager server 10 can be used for managing a distributed storage infrastructure comprised of storage and content delivery systems. From a central point of control, the storage management application 204 can provide various alerts, reports, and configuration tools to clients (e.g., clients 1 depicted in FIG. 1) that are in communication with the manager server 10. Particularly, the storage management application 204 can support logical group formation, which refers to the formation of a logical group of data containers such as files, logical unit numbers (LUN), or any other separately or individually addressable data structure. Logical group formation enables administrators or other users to effectively manage large numbers of distributed devices (e.g., storage servers 2, 6, and 8) through one centralized interface. Common tasks such as device configuration, software upgrades, provisioning, backup, and monitoring are simplified through device and file system consolidation. Group-based management and monitoring can provide users with a global view of how their network and storage infrastructure are performing on a real-time basis. The storage management application 204 also helps ensure data availability and business continuance by allowing users to proactively predict and protect against increased demand for storage and data resources through the use of quotas, threshold settings, and the prepositioning of data.

Furthermore, the storage management application 204 allows a user to specify the collection of data from storage servers 2, 6, and 8 centrally. As explained in detail below, the storage management application 204 allows a user to create data collection policies for use in collecting data. If a user needs to define or change how data are to be collected, the user can use the storage management application 204 to create or change a new or existing data collection policy. A data structure (e.g., a database) can be provided to store the various data collection policies and collected data, and such a data structure can be stored in storage 11 associated with the manager server 10.

Figure 3:
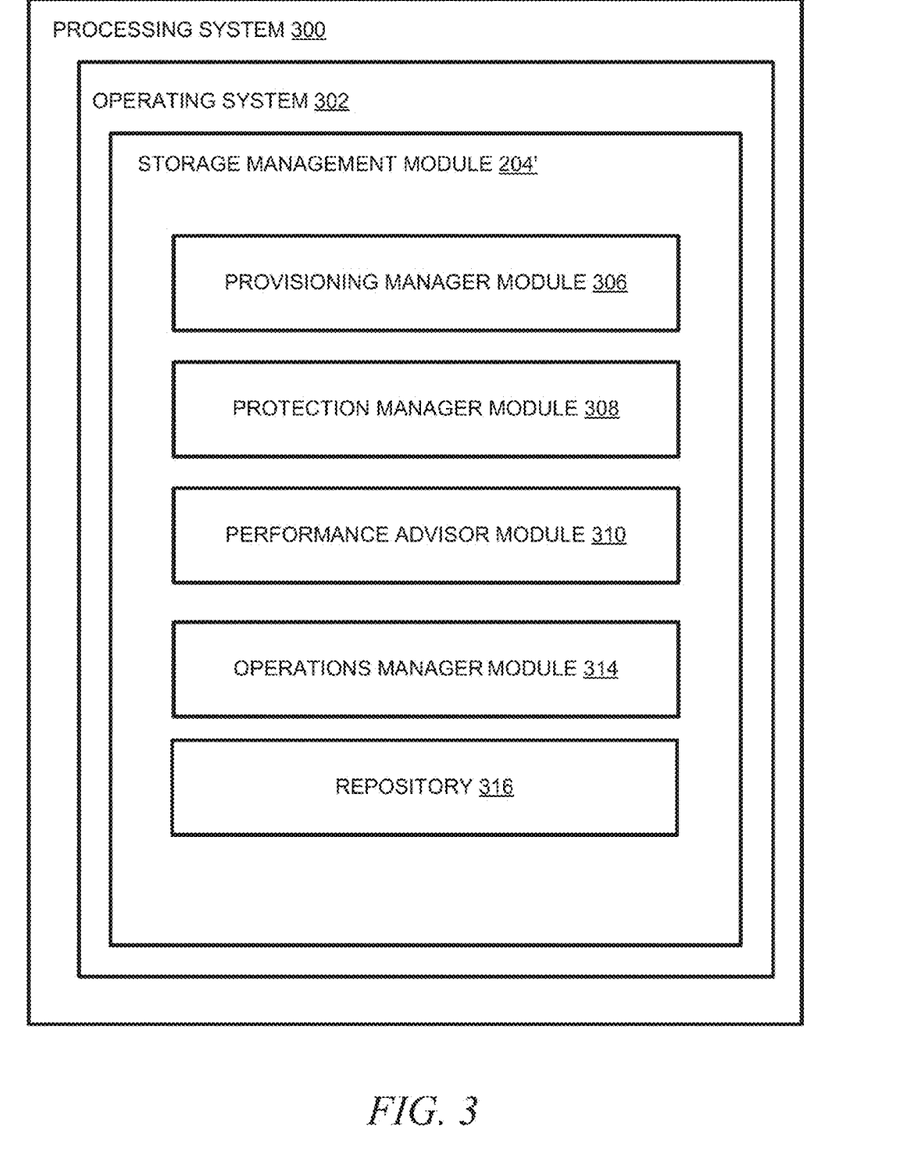
FIG. 3 depicts a high-level block diagram of a machine in the example form of a processing system within which may be executed a set of modules for causing the machine to perform any one or more of the methodologies discussed herein.

FIG. 3 depicts a high-level block diagram of a machine in the example form of a processing system 300 within which may be executed a set of instructions for causing the machine to perform any one or more of the methodologies discussed herein. The processing system 300 may be deployed in the form of, for example, manager server (e.g., manager server 10 depicted in FIG. 2), a storage server (e.g., storage server 2 depicted in FIGS. 1 and 2), a personal computer, a tablet personal computer, a laptop computer, or a variety of other processing systems. In the embodiment where the processing system 300 is a storage server, the storage server may be, for example, a file server, and more particularly, a network attached storage (NAS) appliance. Alternatively, the storage server may be a server that provides clients with access to information organized as data containers, such as individual data blocks, as may be the case in a SAN. In yet another example, the storage server may be a device that provides clients with access to data at both the file level and the block level.

In the embodiment depicted in FIG. 3, the processing system 300 includes an operating system 302 and manages the other software processes and/or services executing on the processing system 300. These software processes and/or services include a storage management module 204', which may be embodied as a storage management application as described above. In this example, the storage management module 204' includes a provisioning manager module 306, a protection manager module 308, a performance advisor module 310, an operations manager module 314, and a repository 316.

Generally, the provisioning manager module 306 provides policy-based provisioning of NAS, SAN, or secondary storage. The provisioning manager module 306 also uses a management console to provide a graphical user interface (GUI), and enables the storage management module 204' to monitor and manage storage entities. It should be appreciated that the management console can be installed and executed on one or more workstations (e.g., clients 1 of FIG. 1). The protection manager module 308 automates the discovery, provisioning, and reporting for data protection operations. The protection manager module 308 can also configure and control all different types of data backup applications hosted on, for example, storage servers. The operations manager module 314 is a client server application that delivers monitoring and management of storage systems from a single console with alerts, reports, performance tools, and configuration tools. The repository 316 provides a central data storage to the various modules 306, 308, 310, and 314 and, as discussed in more detail below, can store performance data as well as data collection policies.

Additionally included in the storage management module 204' is the performance advisor module 310. In general, the performance advisor module 310 is configured to provide a GUI in the management console used for performance management. Additionally, in one embodiment, this module 310 is configured to collect data associated with performances of one or more storage systems. As used herein, this "data" associated with the "performance" of a storage system are data that can be directly or indirectly correlated to the manner in which or the efficiency with which a storage system performs or fulfills its intended purpose. Given that almost every feature or factor, which can be embodied as data, of a storage system can have a direct or indirect correlation with a performance of a storage system, the module 310 can generally collect almost any suitable type of data associated with a storage system. Examples of such "performance data" include a number of processors, a number of read operations, a number of write operations, average processor usage, a number of Common Internet File System (CIFS) operations, and other data. As used herein, it should be noted that "performance data" and "data associated with the performance of a storage system" refer to the same data and therefore, may be used interchangeably.

Instead of collecting all performance data, a user can select specific types of performance data for collection. As explained in detail below, the performance advisor module 310 provides the GUI to allow a user to create data collection policies for specifying the specific types of performance data to be collected. As also explained in more detail below, the user can also create data collection policies that are tied to particular attributes of a storage system.

It should be appreciated that in other embodiments, the processing system 300 may include fewer, more, or different modules apart from those shown in FIG. 3. For example, in an alternate embodiment, the performance advisor module 310 may be integrated within a different module, such as the operations manager module 314 or the provisioning manager module 306.

Figure 4:
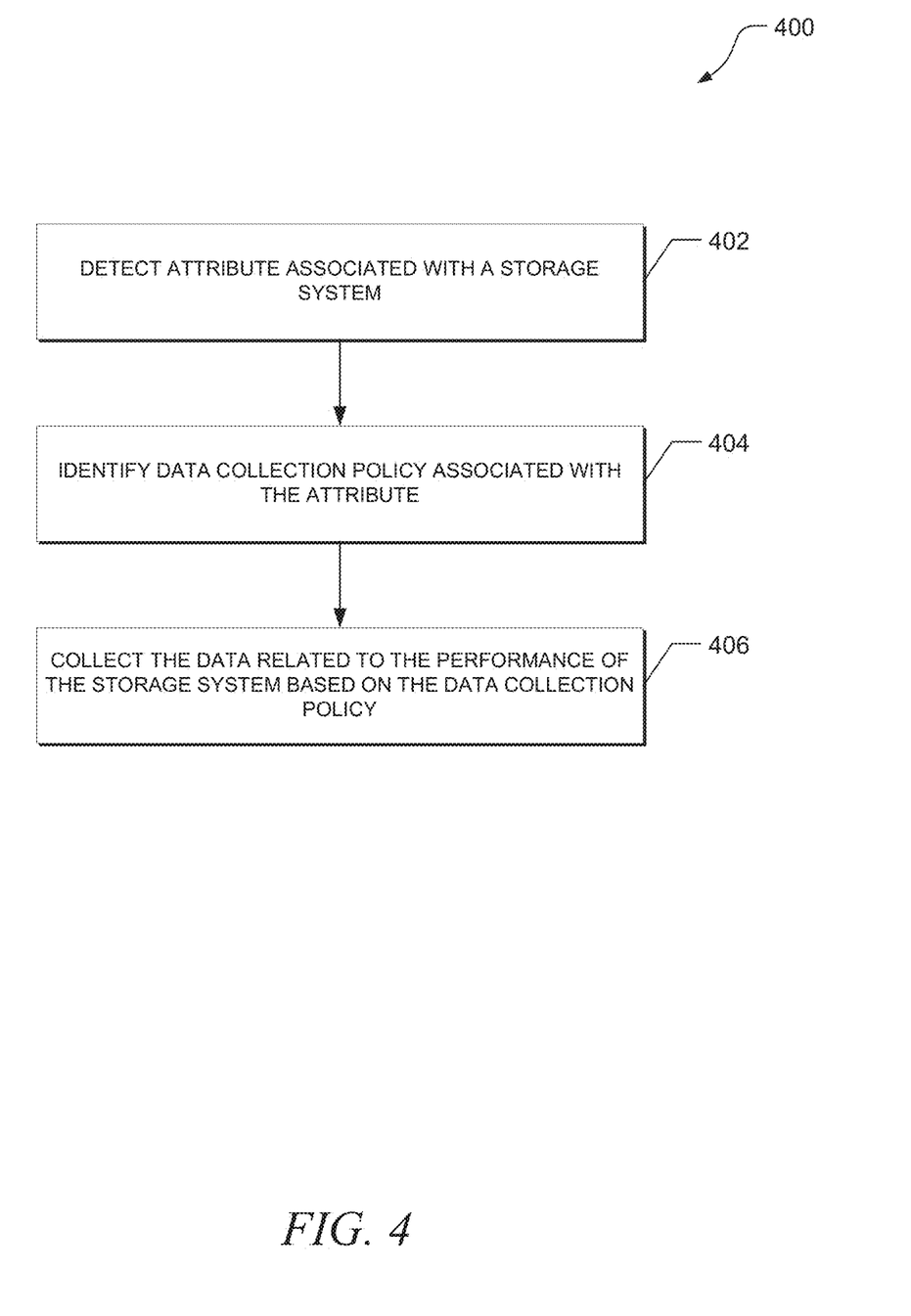
FIG. 4 depicts a flow diagram of a general overview of a method, in accordance with an embodiment, for collecting data associated with a performance of a storage system.

FIG. 4 depicts a flow diagram of a general overview of a method 400, in accordance with an embodiment, for collecting data associated with a performance of a storage system. In an example embodiment, the method 400 may be implemented by the performance advisor module 310 and employed in the processing system 300 of FIG. 3.

In reference to FIG. 4, the performance advisor module or a different module detects one or more attributes associated with a storage system at 402. As used herein, an "attribute" associated with a storage system refers to a property associated with a storage system. A type of communication protocol used by a storage server to communicate with other devices is an example of an attribute associated with a storage system. Examples of different types of communication protocols that can be used within a storage system include file transfer protocol (FTP), Internet Small Computer System Interface (iSCSI), Fibre Channel Protocol (FCP), Common Internet File System (CIFS) protocol, a network file system (NFS) protocol, and other communication protocols. A type of software application executed on a storage server is another example of a different attribute associated with a storage system. Examples of different application types include a database application, an enterprise application, a mail server application, a backup application, and other application types. The type of software application can also include different versions of the same software application. As an example, a 1.0 version of a database application can be a different type of software application from a 2.0 version of the same database application. Other examples of attributes that can be associated with a storage system include type of hardware included in the storage system (e.g., flash memory card, hard drives, and other hardware), type of operating system executed on the storage system, and other attributes.

Upon detection of the attribute, the performance advisor module, at 404, identifies a data collection policy that is associated with the attribute. A "data collection policy," as used herein, refers to a guideline defining the parameters or rules associated with the collection and handling of performance data. For example, the data collection policy can specify that only certain types of performance data are to be collected. Other examples of other different parameters that can be included in a data collection policy are described in more detail below. A user can define the data collection policy. In one embodiment, each data collection policy can be associated with or assigned to one or more attributes associated with a storage system. That is, a user can specify the use of a particular data collection policy if a certain attribute of the storage system is detected. The data collection policy can be stored on the same processing system that is hosting or executing the performance advisor module. In one example, in reference to FIG. 3, the data collection policy can be stored in the repository 316 associated with the storage management module 204'.

Returning to FIG. 4, with a particular data collection policy identified, the performance advisor module then, at 406, collects the performance data based on the data collection policy. As a result, the amount of performance data collected from a storage system can be limited or reduced with the use of a data collection policy. For example, instead of collecting all performance data, a data collection policy can provide a mechanism to filter or limit the scope of the data collection. The type of data to be collected can be further limited by tying the data collection policy to a particular attribute of the storage system, thereby enabling the user to more easily locate relevant performance data. The amount of storage capacity allocated for storing performance data can therefore be reduced. Additionally, the collection of a smaller amount of data may reduce the load on storage systems, thereby possibly increasing the performance of the storage systems. Furthermore, the data collection policies can be stored and reused. As a result, a user does not need to recreate all the rules and parameters associated with the collection of performance data.

Figure 5:
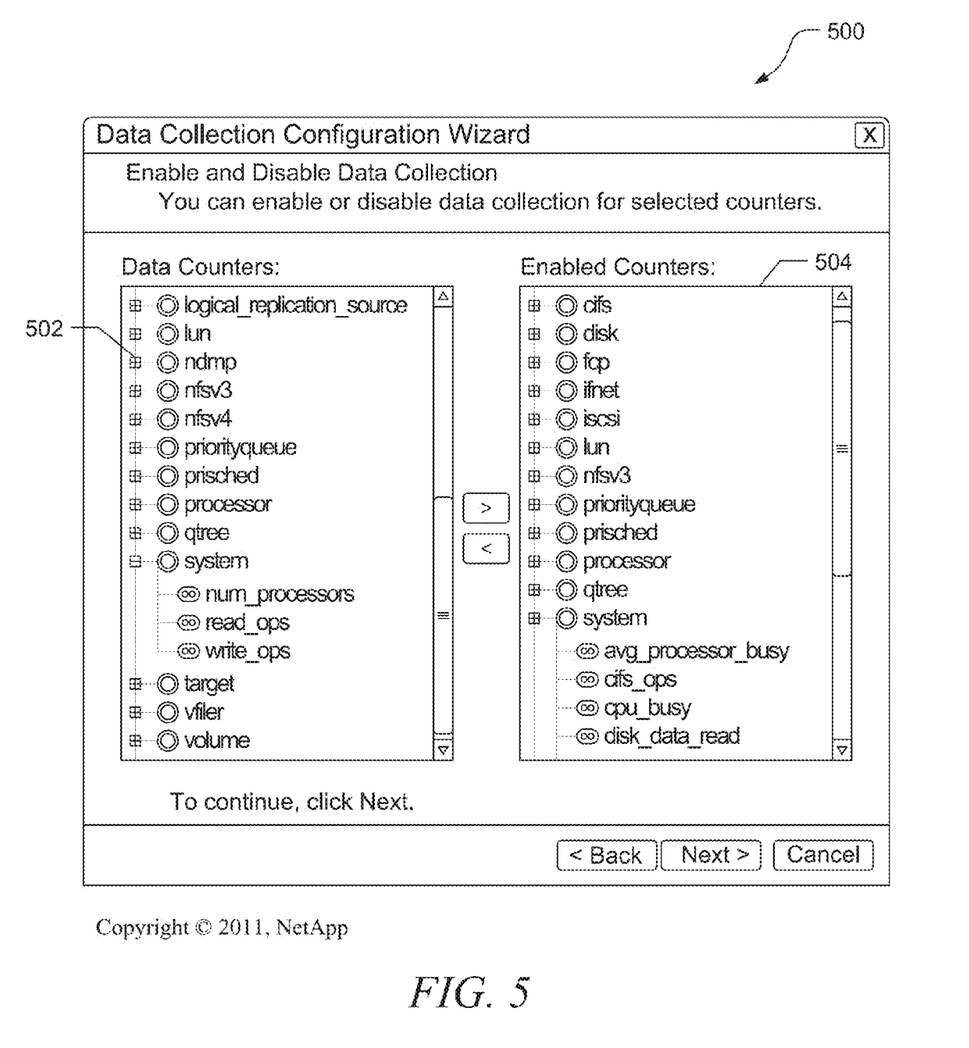
FIG. 5 depicts a diagram of a graphical user interface, in accordance with an embodiment, for defining the type of performance data to be collected in a data collection policy.

FIG. 5 depicts a diagram of a graphical user interface 500, in accordance with an embodiment, for defining the type of performance data to be collected in a data collection policy. A user can define a data collection policy by way of a graphical user interface, and in one embodiment, the data collection policy can specify the type of performance data to be collected. As depicted in FIG. 5, an example of such a graphical user interface 500 includes regions 502 and 504. Region 502 displays a listing of all the different types of performance data that are associated with a storage system and enables a selection of one or more performance data for collection. From region 502, a user can select one or more types of performance data to be collected, such as a number of processors ("num_processors"), a number of read operations ("read_ops"), and a number of write operations ("write_ops").

The other region 504 displays a listing of all the different types of performance data that have been selected to be collected. In this example, region 504 shows that the user has selected at least an average processor usage, ("avg_processor_busy"), a number of CIFS operations ("cifs_ops"), a number of disk reads ("disk_data_read"), as well as other types of performance data to be collected. It should be noted that in the graphical user interface 500, the performance data are referred to as "counters." The "disabled counters" are performance data that are not selected for collection. Conversely, "enabled counters" are performance data that are selected for collection.

As a result, instead of collecting all performance data, a data collection policy can provide a mechanism to filter or limit the scope of the data collection. In one embodiment, such a filtering mechanism can be a predicate and a list of performance data selected by the user. A filtering operation returns those elements (performance data) in the list for which the predicate is true. In another embodiment, the types of performance data that are selected by a user for collection can be stored in a data structure, such as the following database Table A:

TABLE A

| Attribute | Types of Performance Data |
|---|---|
| FCP | fcp_read_ops |
| FCP | fcp_write_ops |
| FCP | fcp_ops |
| iSCSI | iscsi_ops |

In database Table A, the data stored in the "Types of Performance Data" columns identify and define the different types of performance data, and the data stored in the "attribute" columns define and identify the attributes associated with the types of performance data to be collected. For example, the types of performance data "fcp_read_ops," "fcp_write_ops," and "fcp_ops" are associated with attribute "FCP." The type of performance data "isci_ops" is associated with attribute "iSCSI." To identify the types of performance data associated with a particular attribute, a Structured Query Language (SQL) statement can be used, such as "select types_of performance data from table_a where attribute='fcp.'" In yet another embodiment, the types of performance data that are selected by a user for collection can be stored in an Extensible Markup Language (XML) document, an example of such an XML document is as follows:

```
<attribute_counters>
    <attribute>
        <name>fcp</name>
        <counters>
            <counter>fcp_read_ops</counter>
            <counter>fcp_write_ops</counter>
            <counter>fcp_ops</counter>
        </counters>
    </attribute>
</attribute_counters>
```

In the above-referenced XML document, as discussed above, a counter refers to a type of performance data, and the protocol "fcp" is an attribute associated with the counter. Accordingly, for any given attribute, its corresponding types of performance data (or counters) can be filtered by parsing the XML document.

Additionally, a user can associate the data collection policy, as defined using graphical user interface 500, with a particular attribute of the storage system. In this example, a user can specify the types of performance data that are to be collected based on the attributes of a storage system. As an example, after the user has defined the types of performance data to be collected using graphical user interface 500 (e.g., an average processor usage, a number of CIFS operations, a number of disk reads, and other types of performance data), the user may then associate the data collection policy with a particular version of a database application. Upon detection of this particular version of the database application being executed on a storage server, the performance advisor module is configured to retrieve the associated data collection policy, and then retrieve only the types of performance data defined in the data collection policy (e.g., an average processor usage, a number of CIFS operations, a number of disk reads, and other types of performance data).

Figure 6:
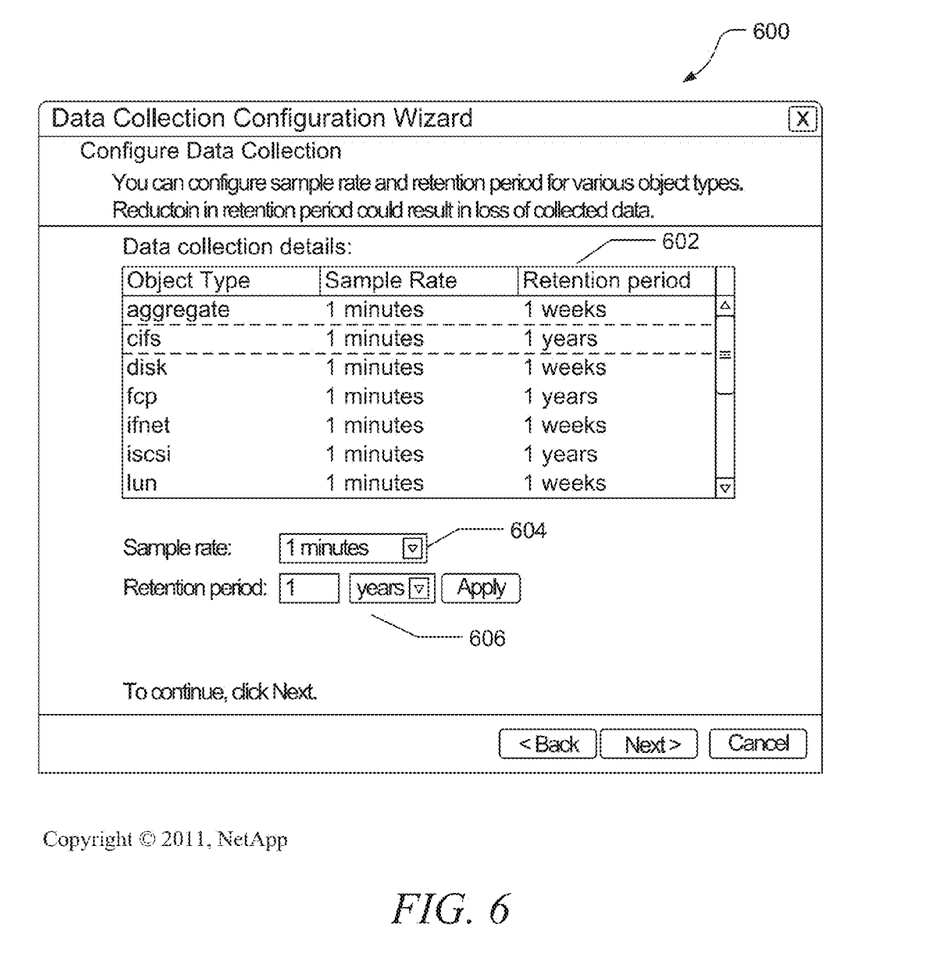
FIG. 6 depicts a diagram of graphical user interface, in accordance with another embodiment, for defining a sample rate and a retention period in a data collection policy.

FIG. 6 depicts a diagram of graphical user interface, in accordance with another embodiment, for defining a sample rate and a retention period in a data collection policy. In addition to the type of performance data (or also referred to as the "object type" in graphical user interface 600), the data collection policy can also specify the sample rate and/or the retention period, in accordance with some embodiments of the present invention. A "sample rate," as used herein, refers to a frequency at which performance data are collected. A "retention period," as used herein, refers to a period of time performance data are to be kept or retained before deletion.

As depicted in FIG. 6, the graphical user interface 600 includes regions 602, 604, and 606. In this embodiment, region 604 provides a drop-down list that enables a user to select a sample rate from the list, such as every one minute, every five minutes, every ten minutes, or other sample rate. Region 606 provides another drop-down list that enables the user to select a retention period from the list, such as one year, one hour, or other retention period.

In one embodiment, each type of performance data can have its own sample rate and/or retention period while stored in, for example, the storage 11 associated with the manager server 10 as shown in FIG. 2. That is, the user can specify in the data collection policy a particular sample rate and/or retention period for each type of performance data to be collected. As depicted in FIG. 6, region 602 displays a listing of all the different types of performance data that have been selected for collection and their corresponding sample rate and retention period. A user can change a sample rate and/or retention period for a particular performance data by selecting the performance data from the listing in region 602 and changing its sample rate and/or retention period by interfacing with regions 604 and 606.

In addition to the type of performance data to be collected, the sample rate, and the retention period, the data collection policy can also define a variety of other parameters associated with the collection and handling of performance data. Examples of these other parameters include the type of user (e.g., administrator or other users), user identification, encoding of the performance data (e.g., compressed and encrypted), scheduling of the collection of performance data (e.g., collect performance data at different time periods and/or intervals), and other parameters.

It should be appreciated that any number of suitable layouts can be designed for region layouts illustrated above as FIGS. 5 and 6 do not represent all layout options available. The displayable regions can be defined by any suitable geometric shape (e.g., rectangle, square, circle, triangle, and other shapes), alphanumeric character, symbol, shading, pattern (e.g., solid, hatch, stripes, and other patterns), and color. Furthermore, for example, the region 604 in FIG. 6, or any other region, may be omitted or dynamically assigned. It should also be appreciated that the regions can be fixed or customizable. Additionally, the processing systems can have a fixed set of layouts, utilize a defined protocol or language to define a layout, or an external structure can be reported to the computing device that defines a layout. Finally, clicking on a region of the graphical user interface can trigger code to cause the functionality described herein.

Figure 7:
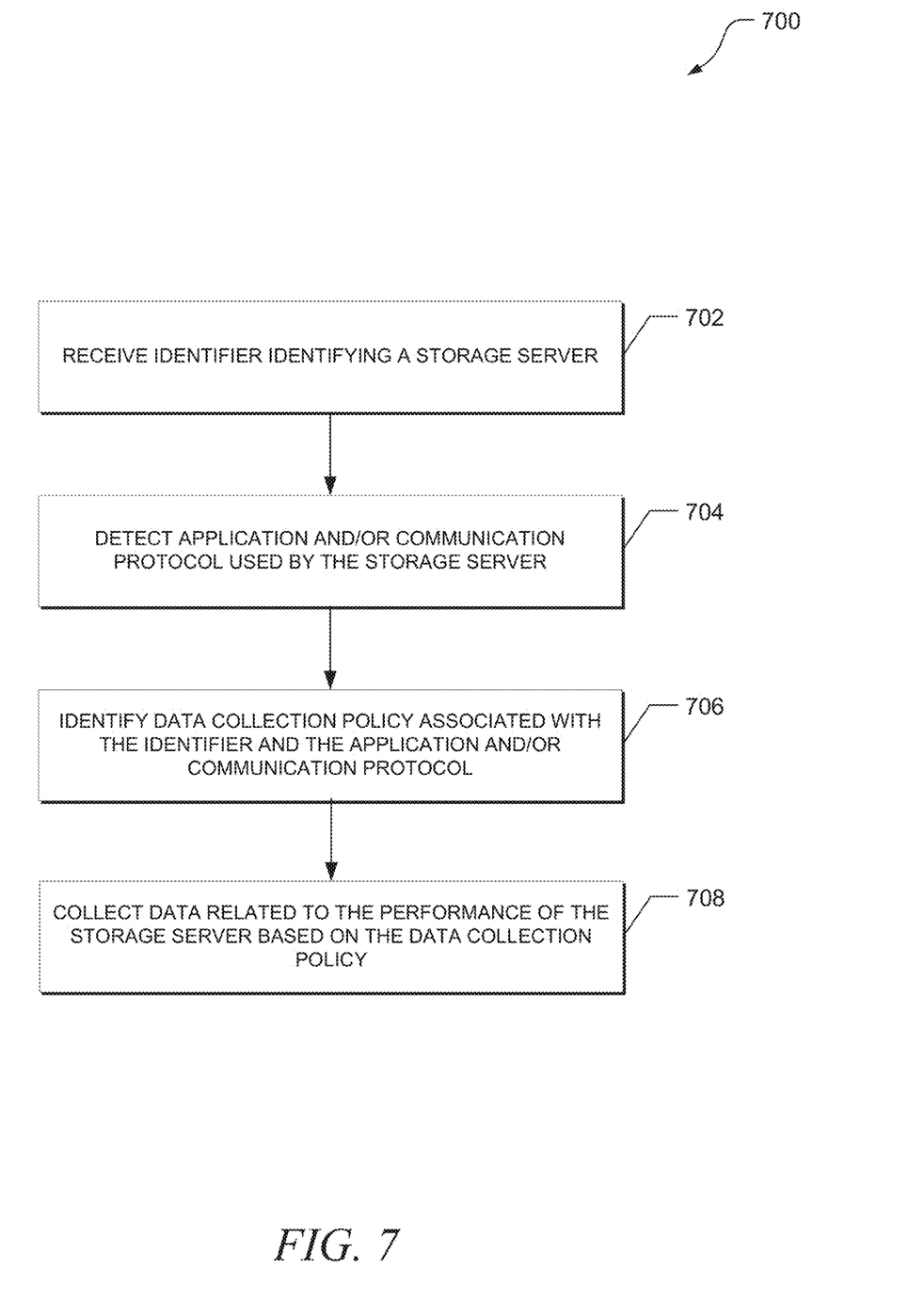
FIG. 7 depicts a flow diagram of a detailed method, in accordance with an alternative embodiment, for collecting data associated with a performance of a storage system.

FIG. 7 depicts a flow diagram of a detailed method 700, in accordance with an alternative embodiment, for collecting data associated with a performance of a storage system. In an example embodiment, the method 700 may be implemented by the performance advisor module 310 and employed in the processing system 300 of FIG. 3.

In reference to FIG. 7, a performance advisor module or a different module receives, at 702, an identifier identifying a particular storage server from multiple storage servers. This identifier refers to a value that uniquely identifies a storage server. It should be noted that in this embodiment, a data collection policy can also be associated with a particular storage server in the storage system. As a result, a storage server can have its own set of data collection policies that are specifically customized for the storage server. A user may define the identifier or this identifier may be provided by a software application. For example, through a management console as discussed above, the user can select a particular storage server in the storage system by way of a graphical user interface. This selection can then be converted into a corresponding identifier that uniquely identifies the selected storage server.

Additionally, the performance advisor module can also, at 704, detect a type of application that is executed on the identified storage server and/or detect a type of protocol used by the storage server. It should be appreciated that a variety of different methodologies may be employed to detect the type of application being executed on a storage server. For example, in one embodiment, the storage management module may include licensing information that identifies all the different applications that are licensed for use in the storage system. Thus, the performance advisor module can read the type of application that has been licensed for use from the licensing information.

If the performance advisor module is configured to detect the type of application that is executed on the storage server, then the performance advisor module can also detect an attribute of the application, in accordance with an alternate embodiment of the present invention. Here, an "attribute" associated with an application refers to a property associated with the application. Examples of such attributes include a number of users of the application, a database size allocated to or used by the application, and other attributes associated with the application.

In detecting the type of communication protocol used by the storage server, the performance advisor module or other modules can employ a variety of different methodologies to detect the type of communication protocol. In one embodiment, the performance advisor module may query a mass storage adaptor, which may be installed on or connected to the storage server, for the information. Particularly, the performance advisor module can transmit a request by way of Simple Network Management Protocol (SNMP) to collect information on the type of communication protocol being used. In another embodiment, the storage management module may include licensing information that identifies all the different types of communication protocols that are licensed for use in the storage system. Thus, the performance advisor module can read the type of communication protocol that has been licensed for use from the licensing information.

Still referring to FIG. 7, upon detecting the type of application and/or communication protocol, the performance advisor module identifies, at 706, the data collection policy that is associated with the identifier and associated with the type of application and/or communication protocol. That is, the performance advisor can locate the particular data collection policy that has been assigned to a particular storage server (as identified by received identifier) and a set of attributes that include the communication protocol, type of application, and even the application attributes, as discussed above. In one embodiment, the performance advisor module can use a lookup data structure (e.g., a lookup table) stored in, as discussed above, the repository 316 of FIG. 3 to identify the particular data collection policy. An example of such a lookup data structure can include listings of data collection policies, storage server identifiers, and various attributes, where each data collection policy is correlated to a set of storage server identifiers and/or attributes.

After the appropriate data collection policy has been identified, the performance advisor module then, at 708, collects the performance data based on the data collection policy. For example, the performance advisor module can specify that a particular type of performance data are to be collected for a specific type of application hosted on a storage server, which is identified by the received identifier. In another example, the performance advisor module can specify that a different type of performance data can be collected for a specific type of communication protocol used by an identified storage server.

Figure 8:
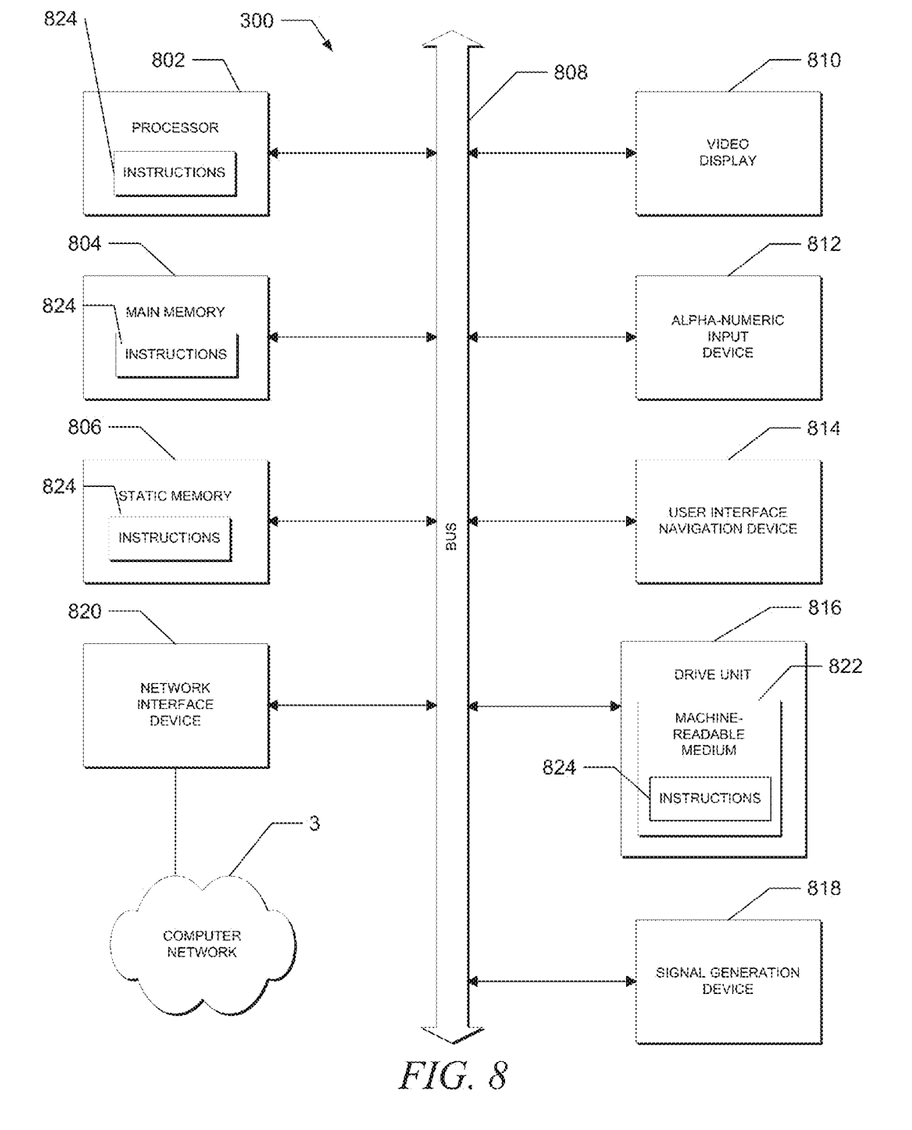
FIG. 8 depicts a hardware block diagram of a machine in the example form of a processing system within which may be executed a set of instructions for causing the machine to perform any one or more of the methodologies discussed herein.

FIG. 8 depicts a hardware block diagram of a machine in the example form of a processing system 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 300 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The processing system 300 may further include video display unit 810 (e.g., a plasma display, a liquid crystal display (LCD) or a cathode ray tube (CRT)). The processing system 300 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by processing system 300, with the main memory 804 and processor 802 also constituting machine-readable, tangible media.

The data structures and instructions 824 may further be transmitted or received over a computer network 3 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 300) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques collecting performance data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of collecting data associated with a performance of a storage system, the method being performed by a processor of a managing server and comprising:
   receiving, at the managing server, an identifier identifying a storage server from a plurality of storage servers associated with the storage system;
   detecting, using the processor of the managing server, at least one attribute associated with the storage server, the at least one attribute including a type of communication protocol used by the storage server;
   in response to detecting the type of communication protocol used by the storage server, identifying, using the processor of the managing server, a data collection policy from a plurality of data collection policies based on (i) the received identifier and (ii) the detected at least one attribute, including the type of communication protocol, wherein the data collection policy defines a type of data to be collected, the data being associated with the performance of the storage system; and
   collecting the data associated with the performance of the storage system based on the data collection policy.

2. The method of claim 1, wherein the data collection policy further defines a sample rate, and wherein the data are collected at the sample rate.

3. The method of claim 1, wherein the data collection policy further defines a retention period of the data, the method further comprising deleting the data after the retention period.

4. The method of claim 1, wherein the at least one attribute includes a type of application executed on the storage server.

5. The method of claim 1, wherein the type of communication protocol is selected from the group consisting of a file transfer protocol (FTP), an Internet Small Computer System Interface (iSCSI), a Fiber Channel Protocol (FCP), a Common Internet File System (CIFS) protocol, and a network file system (NFS) protocol.

6. The method of claim 4, further comprising detecting a property of the application executed on the storage server, the property including at least one of a number of users of the application, or a database size used by the application.

7. The method of claim 4, wherein the type of application is at least one of a database application, an enterprise application, or a mail server application.

8. A non-transitory machine-readable medium storing instructions that, when executed by a processor of a managing server, cause the processor to perform operations comprising:
   receiving, at the managing server, an identifier identifying a storage server from a plurality of storage servers;
   detecting a type of application being executed on the storage server and a type of communication protocol being used by the storage server;
   identifying a data collection policy from a plurality of data collection policies based on (i) the identifier, (ii) the type of application, and (iii) the type of communication protocol, wherein the data collection policy defines a type of data to be collected, the data being associated with a performance of the storage server; and
   collecting the data associated with the performance of the storage server based on the data collection policy.

9. The non-transitory machine-readable medium of claim 8, wherein the instructions cause the processor to further detect an attribute of the application, and wherein the instructions cause the processor to identify the data collection policy based further on the detected attribute of the application.

10. The non-transitory machine-readable medium of claim 9, wherein the attribute of the application is at least one of a number of users of the application, or a database size used by the application.

11. The non-transitory machine-readable medium of claim 8, wherein the instructions cause the processor to detect the type of application being executed on the storage server by reading the type of application from licensing information.

12. The non-transitory machine-readable medium of claim 8, wherein the instructions cause the processor to detect the type of communication protocol used by the storage server by querying a mass storage adaptor associated with the storage server.

13. The non-transitory machine-readable medium of claim 8, wherein the data collection policy further defines a sample rate, and wherein the data are collected at the sample rate.

14. The non-transitory machine-readable medium of claim 8, wherein the data collection policy further defines a retention period of the data, wherein the instructions cause the processor to further delete the data after the retention period.

15. A processing system comprising:
   a processor; and
   a memory in communication with the processor, the memory being configured to store a performance advisor module that is executable by the processor, the performance advisor module having instructions that when executed by the processor, cause the processor to perform operations comprising:
      receiving, at the processing system, an identifier identifying a storage server from a plurality of storage servers associated with a storage system;
      detecting at least one attribute associated with the storage server, the at least one attribute including a type of communication protocol used by the storage server;
      in response to detecting the type of communication protocol used by the storage server, identifying a data collection policy from a plurality of data collection policies based on (i) the received identifier, and (ii) the detected at least one attribute, including the type of communication protocol, wherein the data collection policy defines a type of data to be collected, the data being associated with the performance of the storage system; and
      collecting the data associated with the performance of the storage system based on the data collection policy.

16. The processing system of claim 15, wherein the data collection policy further defines a sample rate, and wherein the data are collected at the sample rate.

17. The processing system of claim 15, wherein the data collection policy further defines a retention period of the data, the method further comprising deleting the data after the retention period.

18. The processing system of claim 15, wherein the at least one attribute includes a type of application executed on the storage server.

19. The processing system of claim 18, wherein the type of application is at least one of a database application, an enterprise application, or a mail server application.

20. The processing system of claim 15, wherein the type of communication protocol is selected from the group consisting of a file transfer protocol (FTP), an Internet Small Computer System Interface (iSCSI), a Fiber Channel Protocol (FCP), a Common Internet File System (CIFS) protocol, and a network file system (NFS) protocol.

* * * * *